(Model.)

H. WEBER, Jr.
Plow Sulky.

No. 241,103.  Patented May 3, 1881.

WITNESSES:
A. Schehl.
C. Sedgwick

INVENTOR:
H. Weber Jr
BY Munn & Co
ATTORNEYS.

N. PETERS, Photo-Lithographer, Washington, D. C.

UNITED STATES PATENT OFFICE.

HENRY WEBER, JR., OF GRAND MEADOW, MINNESOTA.

PLOW-SULKY.

SPECIFICATION forming part of Letters Patent No. 241,103, dated May 3, 1881.

Application filed February 19, 1881. (Model.)

*To all whom it may concern:*

Be it known that I, HENRY WEBER, Jr., of Grand Meadow, in the county of Mower and State of Minnesota, have invented a new and useful Improvement in Plow-Sulkies, of which the following is a specification.

Figure 1:
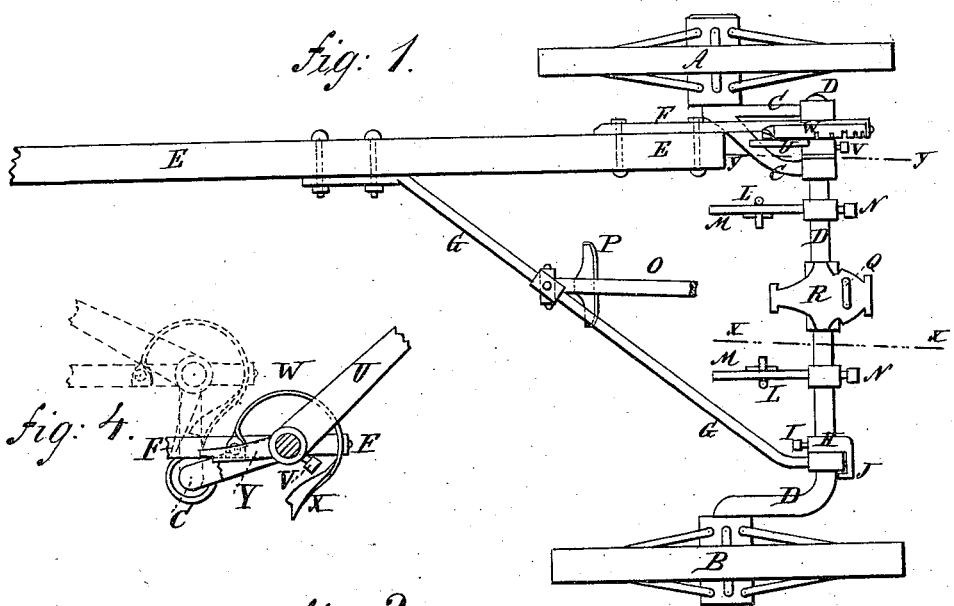
Figure 4:
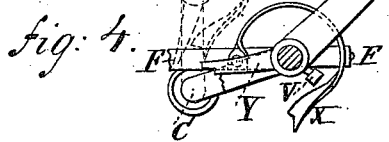
Figure 2:
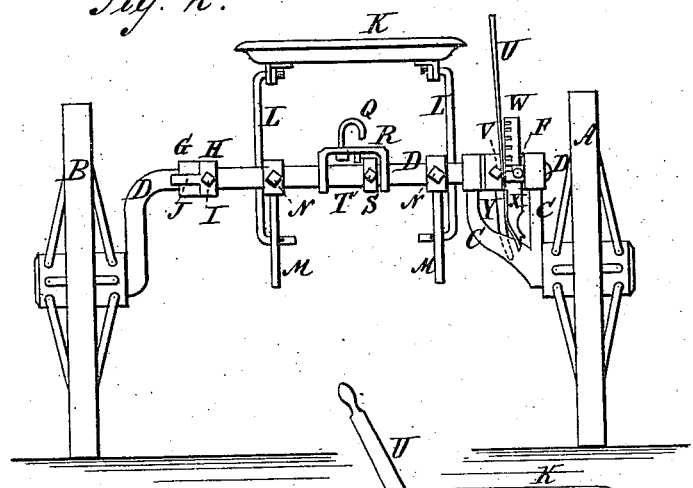
Figure 3:
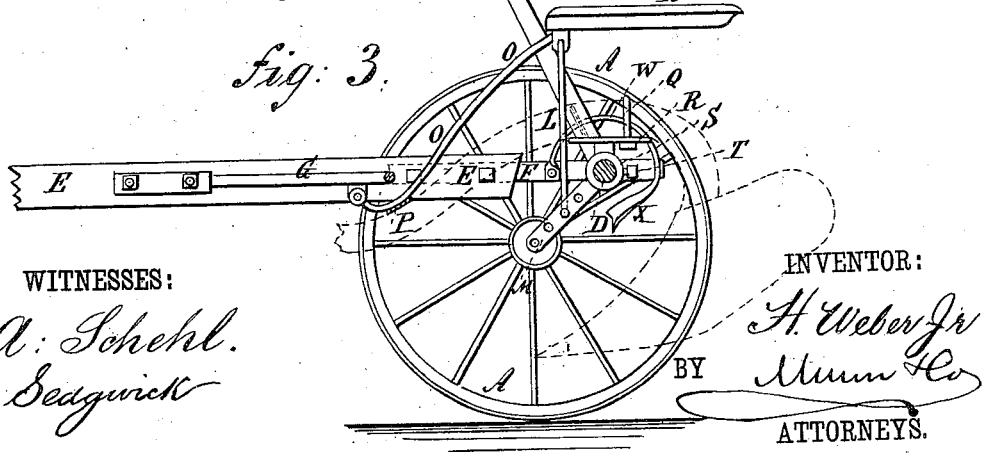

Figure 1 is a plan view of my improvement, the driver's seat being removed. Fig. 2 is a rear elevation of the sulky. Fig. 3 is a sectional side elevation of the sulky, taken through the line $x\ x$, Fig. 1. Fig. 4 is a sectional side elevation of a part of the sulky, taken through the line $y\ y$, Fig. 1.

Similar letters of reference indicate corresponding parts.

The object of this invention is to facilitate the controlling and adjusting of plow-sulkies.

A represents the furrow-wheel, and B the landside-wheel, of the sulky. The wheel A revolves upon the journal of a crank-axle, C, the upper arm of which is branched, and has bearings in the ends of its branches to receive the main axle D. The axle D has a crank formed upon its other or landside end to receive the wheel B. The tongue E does not extend back quite to the axle D, and has a bar, F, attached to its rear end. The tongue-bar F has a bearing formed in its rear part to receive the axle D. The tongue E is strengthened against lateral strain by an inclined brace, G, the forward end of which is bolted to the side of the tongue E. The rear end of the brace G has a bearing formed in it to receive the axle D, and is placed upon the said axle near its crank, where it is kept in place by a collar, H, placed upon the axle D, and secured to the said axle by a set-screw, I. The collar H has a projection, J, formed upon it, to serve as a stop to limit the revolution of the axle D by coming in contact with the brace G.

To the forward part of the driver's seat K are hinged the upper ends of two rods, L, the lower ends of which are bent to one side to enter holes in the arms M. The rear ends of the arms M have bearings formed in them to receive the axle D, and are secured to the said axle by set-screws N. The arms M have several holes formed in them to receive the ends of the rods L, to obtain more or less leverage, as the driver may be light or heavy.

To the driver's seat K is attached the upper end of the inclined bar O, by which the said seat is held in position. The lower end of the bar O is attached to the tongue-brace G.

To the bar O, at or near its lower end, is attached a cross-bar, P, to serve as a rest for the driver's feet, and also as a stop for the forward end of the plow-beam, to prevent the said forward end of the plow-beam from rising when the plow is raised from the ground. The plow-beam is secured by a hook or U-bolt, Q, to the upper side of a small plate, R, which has bearings attached to its under side to receive the axle D. The plate R is secured in place upon the axle D by a collar, S, interposed between one of the bearings of the said plate and a projection formed upon the lower side of the said plate. The collar S is secured to the axle D by a set-screw, T, so that by loosening the said set-screw, the collar S and plate R, and with them the plow-beam, can be adjusted to cause the plow to cut a wide or narrow furrow, as may be desired. The axle D is turned to raise and lower the plow and adjust the wheels to cause the plow to work at any desired depth in the ground by a lever, U, which has a bearing in its lower end to receive the axle D. The lever U is placed upon the axle D, between the branches of the crank-axle C, and is secured to the said axle by a set-screw, V, so that the axle D can be turned by operating the lever U. The lever U moves along an arched bar, W, and engages with notches formed in the edge of the said bar, so that the said lever will be held securely in any position into which it may be adjusted. The ends of the arched bar W are attached to the bar F of the tongue E. The rear end, $x$, of the arched catch-bar W is extended downward to serve as a stop for the crank-axle C to strike against to prevent the said crank-axle from swinging any farther back than into a vertical position.

Upon the bearing of the lever U is formed an arm, Y, which projects in such a direction as to strike against the crank-axle C when both the crank-axles are turned down into vertical positions for taking the sulky from place to place, holding the said crank-axle C against the stop $x$, and thus keeping it in place. When the wheel A is in a furrow and the plow at work, the crank-axle C rests against the bar F of the tongue, and the crank of the axle D is inclined forward more or less, according as it is desired to cut a deeper or shallower furrow.

With this construction the weight of the driver balances the weight of the plow, so that the plow can be raised and lowered very easily.

Having thus fully described my invention, I claim as new and desire to secure by Letters Patent—

1. The combination, with axle, seat, and arms M, of the brace G, provided with a bearing for said axle, and the collar H, provided with a projection, J, as and for the purpose specified.

2. In a plow-sulky, the combination, with the axle D, the tongue-brace G, and the driver's seat K, of the arms M, the hinged rods L, and the inclined bar O, substantially as herein shown and described, whereby the driver's weight is made to balance the weight of the plow, as set forth.

3. In a plow-sulky, the combination, with the lever U, the axle D, and the crank-axle C, of the arm Y, substantially as herein shown and described, whereby the crank-axle C is locked in place when both cranks are in vertical positions, as set forth.

HENRY WEBER, JR.

Witnesses:
A. B. FUNDERHIDE,
ROBERT WEBER.